T. A. POWELL.
GRASS CATCHER FOR LAWN MOWERS.
APPLICATION FILED MAY 12, 1920.
1,400,907.
Patented Dec. 20, 1921.
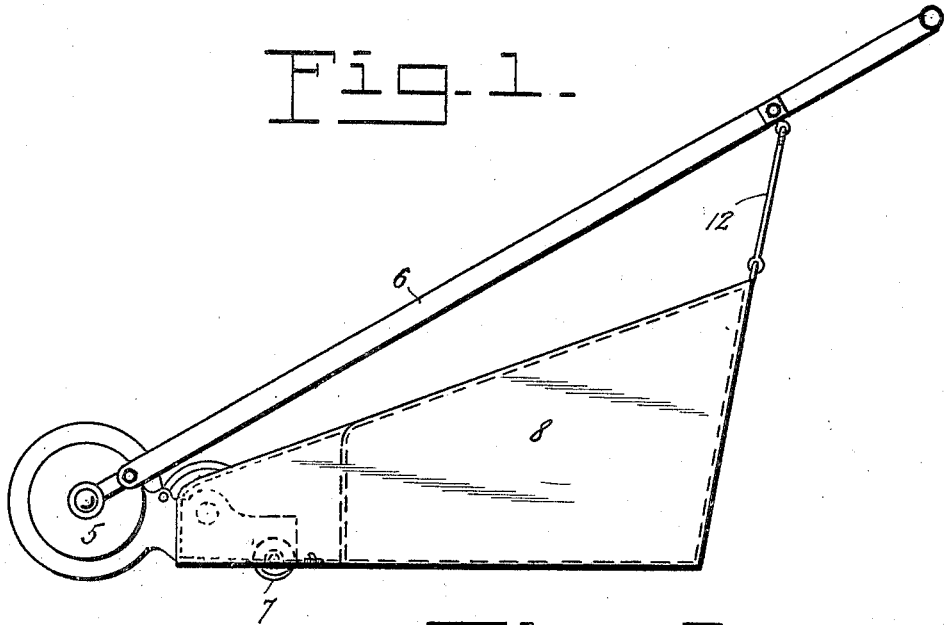
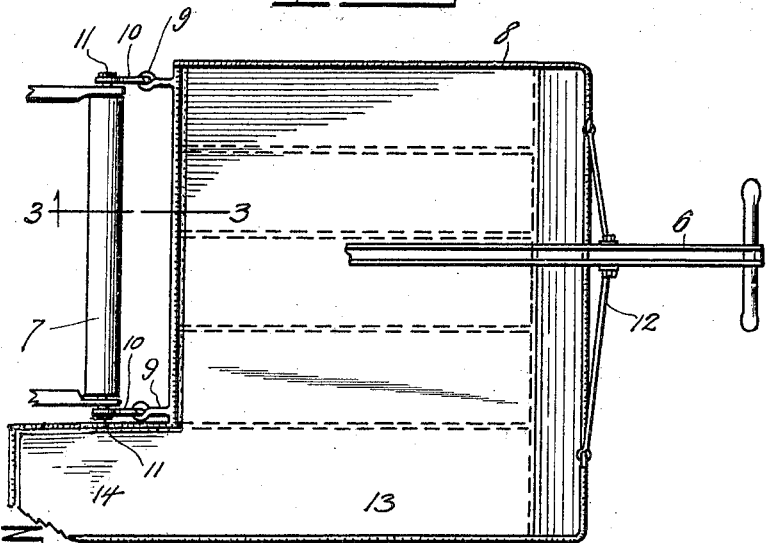
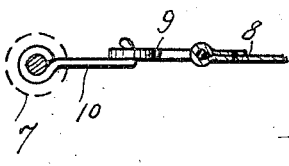
T. A. Powell, INVENTOR.
BY
ATTORNEYS.

UNITED STATES PATENT OFFICE.

THOMAS A. POWELL, OF NAUVOO, ILLINOIS.

GRASS-CATCHER FOR LAWN-MOWERS.

1,400,907. Specification of Letters Patent. Patented Dec. 20, 1921.

Application filed May 12, 1920. Serial No. 380,847.

*To all whom it may concern:*

Be it known that I, THOMAS A. POWELL, a citizen of the United States, residing at Nauvoo, in the county of Hancock and State of Illinois, have invented new and useful Improvements in Grass-Catchers for Lawn-Mowers, of which the following is a specification.

This invention relates to devices applicable to lawn mowers and designed to catch the grass which is thrown back by the action of the cutters, and its object is to provide a device of this kind which not only catches the grass thrown rearwardly, but also that which is thrown sidewise by the cutters, due to the helical set of the blades.

The object stated is attained by means of a novel combination and arrangement of parts to be hereinafter described and claimed, and in order that the same may be better understood, reference is had to the accompanying drawing forming a part of this specification.

In the drawing,

Figure 1 is a side elevation showing the application of the invention;

Fig. 2 is a plan view thereof, and

Fig. 3 is a cross section on the line 3—3 of Fig. 2.

In the drawing, 5 denotes a lawn mower of conventional type which is manually operated by a rearwardly extending push bar or handle 6. At the rear of the mower frame is the usual transverse ground engaging roller 7.

The grass catcher which is the subject matter of the present application for patent, consists of a basket-like receptacle 8 open in front and at the top so that the grass thrown rearwardly by the cutting reel drops into the receptacle, and the latter may be constructed of any suitable textile material mounted over a frame of wire to obtain the basket-like form.

The forward end of the receptacle 8 frame has eyes 9 at the bottom engageable by hooks 10 connected to the rear ends of the mower frame by the bolts 11 which fasten the shaft of the roller 7 in said frame. The rear end of the receptacle may be held suspended from the push bar 6 by a link or other suitable suspension device 12.

In order to catch the grass which is thrown sidewise by the cutting reel, due to the helical set of the blades, the receptacle 8 has an extension 13 on one side so that this side projects laterally a greater distance than the other side. The extension is also continued forwardly to terminate just behind the wheel of the mower or along one side of the roller 7 and in advance of the forward edge of the main portion of the receptacle 8, as clearly shown in Fig. 2. This extension effectually serves to catch all grass which is thrown sidewise by the cutting reel, and as the main portion of the receptacle catches the grass which is thrown straight back, none of the grass falls back on the lawn, and hence little or no raking is required.

I claim:

A grass catcher for lawn mowers comprising a basket-like receptacle having an extension on one side to project laterally with respect to the mower for a greater distance than the opposite side, and said extension being continued forwardly to terminate in advance of the main portion of the receptacle and alongside one end of the cutting reel.

In testimony whereof I affix my signature.

THOMAS A. POWELL.